(12) United States Patent
Han

(10) Patent No.: US 7,486,888 B2
(45) Date of Patent: Feb. 3, 2009

(54) METHOD OF IDENTIFYING INFRARED TRANSMISSION HEAD FUNCTION

(75) Inventor: Chia-Hui Han, Kaohsiung (TW)

(73) Assignee: VIA Technologies, Inc., Taipei Hsien (TW)

( * ) Notice: Subject to any disclaimer, the term of this patent is extended or adjusted under 35 U.S.C. 154(b) by 1669 days.

(21) Appl. No.: 10/013,981

(22) Filed: Dec. 10, 2001

(65) Prior Publication Data

US 2003/0072049 A1    Apr. 17, 2003

(30) Foreign Application Priority Data

Oct. 16, 2001    (TW)    ............................ 90125507 A

(51) Int. Cl.
*H04B 10/08* (2006.01)
*H04B 17/00* (2006.01)

(52) U.S. Cl. .................................. 398/16

(58) Field of Classification Search ............ 398/16, 398/106, 107, 108, 115, 130, 128, 137; 345/158; 714/715; 359/110; 710/305
See application file for complete search history.

(56) References Cited

U.S. PATENT DOCUMENTS

| | | | | |
|---|---|---|---|---|
| 5,438,325 A | * | 8/1995 | Nishigaki et al. | 340/825.24 |
| 5,726,645 A | * | 3/1998 | Kamon et al. | 340/825.22 |
| 5,737,107 A | * | 4/1998 | Umeda | 398/106 |
| 6,008,735 A | * | 12/1999 | Chiloyan et al. | 340/825.22 |
| 6,185,620 B1 | * | 2/2001 | Weber et al. | 709/230 |
| 6,426,820 B1 | * | 7/2002 | Verzulli | 398/106 |
| 6,747,568 B1 | * | 6/2004 | Teskey | 340/825.72 |

OTHER PUBLICATIONS

Microsoft Press Computer Dictionary, 1994, item "concurrent".*
http://en.wikipedia.org/, item southbridge (computing), printed on May 26, 2006.*

* cited by examiner

*Primary Examiner*—Shi K Li
(74) *Attorney, Agent, or Firm*—J.C. Patents

(57) ABSTRACT

A transmission method for identifying infrared transmission head is provided. The infrared transmission head is coupled to an infrared controller. The infrared controller is set to a test circuit mode. The infrared controller is programmed according to the test transmission mode associated with the test brand name of the infrared transmission head and test transmission data is transmitted. In the meantime, the infrared controller receives reception test data from the infrared transmission head according to the test transmission mode associated with the test brand name of the infrared transmission head. If the transmission test data and the reception test data are identical, the test brand name and associated test transmission mode are registered. The infrared transmission head operates according to the registered test brand name and associated test transmission mode of the infrared transmission head.

14 Claims, 4 Drawing Sheets

# METHOD OF IDENTIFYING INFRARED TRANSMISSION HEAD FUNCTION

CROSS-REFERENCE TO RELATED APPLICATION

This application claims the priority benefit of Taiwan application serial no. 90125507, filed Oct. 16, 2001.

BACKGROUND OF THE INVENTION

1. Field of Invention

The present invention relates to an infrared controller. More particularly, the present invention relates to a method of identifying the brand name and transmission mode of an infrared transmission head.

2. Description of Related Art

Due to the variety of manufacturers, each infrared transmission head is manufactured according to their own specification and often create incompatibility between an infrared controller manufactured by one company with an infrared transmission head manufactured by another company. Furthermore, a conventional brand name infrared controller requires a South Bridge control chipset to provide 8 leads for coupling with an infrared transmission head. In general, these leads provided by the South Bridge control chipset are used to identify the brand name of the infrared transmission head. Most manufacturers of the infrared transmission heads choose an infrared controller design of its own and fix the potential level on each of these leads so that an infrared transmission head manufactured by the particular manufacturer can be easily identified. However, such arrangements lead to additional manufacturing cost for the South Bridge control chipset. Moreover, due to difficulties in identifying the brand name of an infrared transmission head just by their external appearance, a wrong infrared transmission head may couple with an infrared controller and increase installation difficulty.

FIG. 1 is a block diagram showing a conventional connection between an infrared controller 100 and an infrared transmission head 300. As shown in FIG. 1, a South Bridge chipset 400 provides eight leads to the infrared controller 100. Information regarding the brand name and transmission mode of the particular infrared transmission head 300 is received via the output terminals 30, 40, 50 and 60 of the South Bridge chipset 400. Voltages at the output terminals 30, 40, 50 and 60 are set up in accordance with the design of various infrared controller manufacturers. In other words, the infrared controller determines the type of transmission and coupling with the infrared transmission head. Consequently, the infrared controller may operate with an infrared transmission head having a brand name identical to the infrared controller only.

FIG. 2 is a block diagram showing an alternative conventional connection between an infrared controller and an infrared transmission head. As shown in FIG. 2, the brand name and transmission mode of the infrared transmission head 300 are determined by the output voltages at the output terminals 30, 40, 50 and 60. Voltages at the output terminals 30, 40, 50 and 60 are set up in accordance with the design of infrared transmission head manufacturers. In other words, the infrared transmission head determines the type of transmission and coupling with the infrared controller. Consequently, the infrared transmission head may operate only when driven by an infrared controller having a brand name identical to the infrared transmission head only.

In brief, the conventional method of connecting up the infrared controller and infrared transmission head often leads to incompatibility problems due to non-uniform design specifications provided by each infrared controller and infrared transmission head manufacturer. Hence, a simple and effective transmission method for determining the brand name of an infrared transmission head, appropriately corresponding with an infrared controller and at the same time supporting any transmission/reception functions is in demand.

SUMMARY OF THE INVENTION

Accordingly, one object of the present invention is to provide a transmission method capable of identifying infrared transmission head functions and effectively utilizing loop circuit testing to determine the brand name and transmission mode of the infrared transmission head so that the need for producing additional infrared controller is eliminated.

A second object of this invention is to provide a transmission method capable of identifying infrared transmission head function through the utilization of two groups of direct access memory devices. One group of direct access memory devices holds transmission test data while the other group of direct access memory devices holds reception test data so that transmission and reception are supported at the same time.

To achieve these and other advantages and in accordance with the purpose of the invention, as embodied and broadly described herein, the invention provides a transmission method of identifying infrared transmission head function. The transmission method includes the following steps. First, an infrared controller is provided. The infrared controller is coupled to an infrared transmission head. A testing circuit mode of the infrared controller is set. According to the test transmission mode corresponding to the brand name of the infrared transmission head, the infrared controller is programmed and then outputs the test data. Thereafter, the infrared controller receives the test data according to the test transmission mode corresponding to the brand name of the infrared transmission head. If the transmission test data and the received test data are identical, information regarding the brand name and corresponding test transmission mode of the infrared transmission head is stored. The infrared transmission head is operated according to the stored brand name and corresponding test transmission mode information of the infrared transmission head. Moreover, the infrared controller includes two groups of direct access memory devices. One group of direct access memory devices holds the transmission test data while the other group of direct access memory devices holds the received test data. Furthermore, the infrared controller is enclosed within a South Bridge control chipset. The South Bridge control chip provides 5 leads to serve as the transmission/reception terminals with the infrared controller.

This invention also provides an alternative transmission method applicable to an infrared controller for identifying infrared transmission head functions. The infrared controller is coupled to an infrared transmission head in such a way that the infrared controller supports data transmission and reception at the same time. The transmission method includes the following steps:

a. setting up a test circuit mode of the infrared controller;
b. selecting a test brand name and a corresponding test transmission mode among a plurality of brand names;
c. programming the infrared controller and outputting the transmission test data according to the test transmission mode corresponding to the test brand name of the infrared transmission head;
d. transmitting back the received test data according to the test transmission mode corresponding to the test brand name of the infrared transmission head;

e. registering up the test brand name and corresponding test transmission mode of the infrared transmission head if the transmission test data and the received test data are identical;

f. repeating the steps from step b to step e until the infrared transmission head of all brand names has been selected; and g. operating the infrared transmission head according to the registered test brand name and corresponding test transmission mode of the infrared transmission head.

In general, a conventional infrared controller uses a half-duplex mode for transmission. In other words, reception is temporarily shut during data transmission and transmission is shut during data reception to prevent interference. This mode of operation prevents automatic determination of brand name and transmission mode of an infrared transmission head. In the aforementioned method of determining the brand name and transmission mode of an infrared transmission head, the infrared controller includes two groups of direct access memory devices so that now the infrared controller has full duplex capacity. The infrared controller supports data transmission and reception simultaneously so that the type of infrared transmission head and corresponding transmission mode are determined automatically. Furthermore, because the transmission and reception of data as well as the setting of brand name and transmission mode of the infrared transmission head is achieved through the same leads of a South Bridge control chipset, leads can be reduced and therefore production cost is also reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
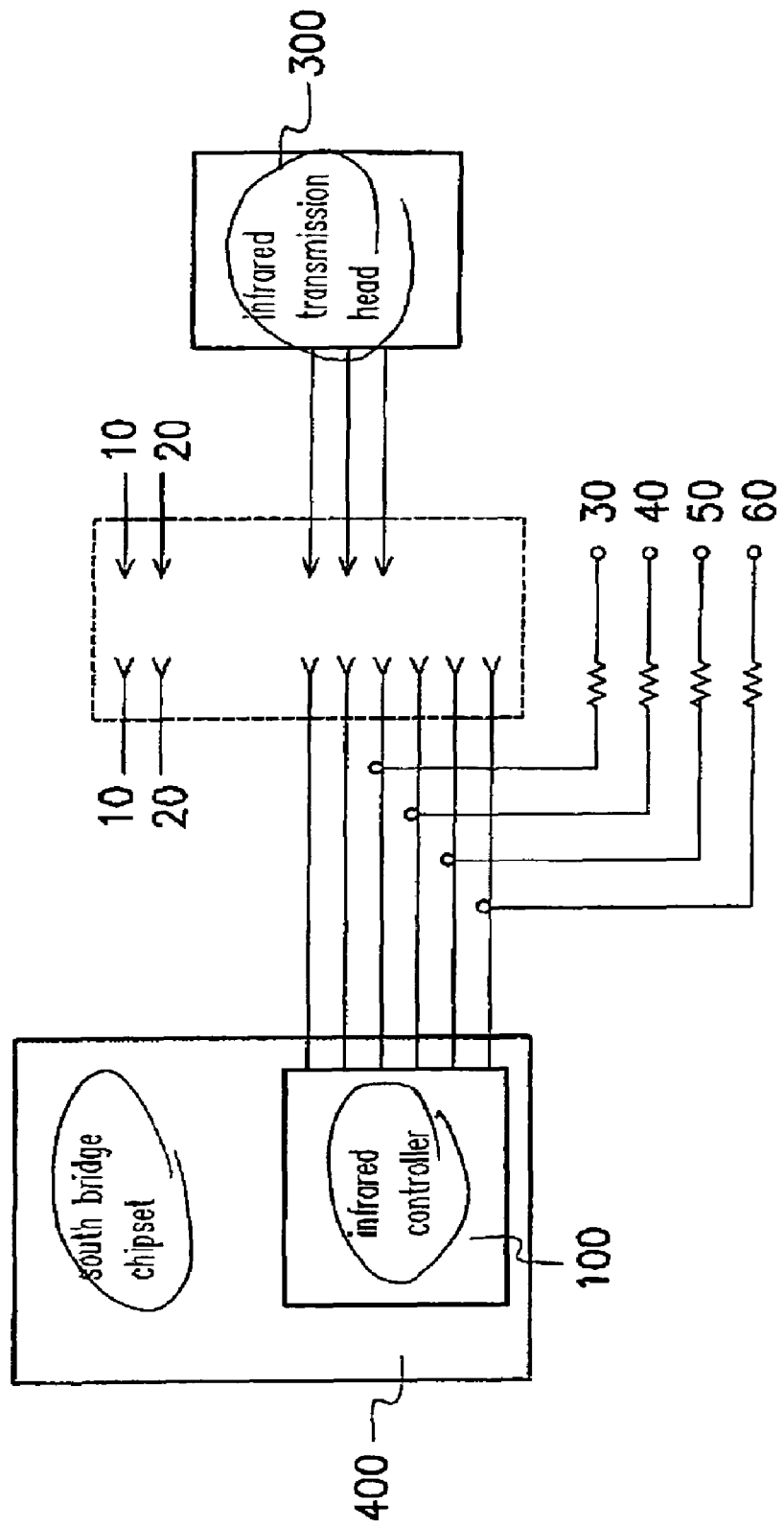
FIG. 1 is a block diagram showing the conventional connection between an infrared controller and an infrared transmission head.
Figure 2:
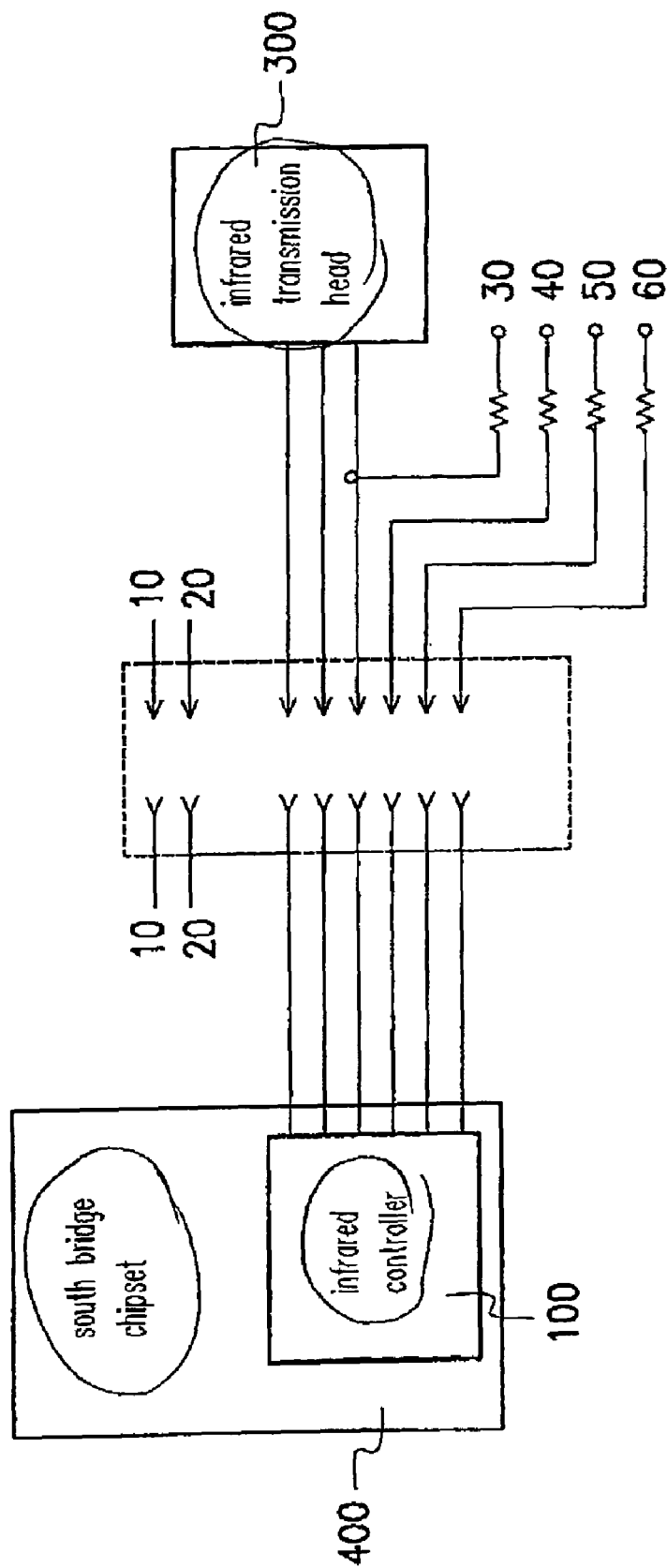
FIG. 2 is a block diagram showing an alternative conventional connection between an infrared controller and an infrared transmission head.

Reference will now be made in detail to the present preferred embodiments of the invention, examples of which are illustrated in the accompanying drawings. Wherever possible, the same reference numbers are used in the drawings and the description to refer to the same or like parts.

Figure 3:
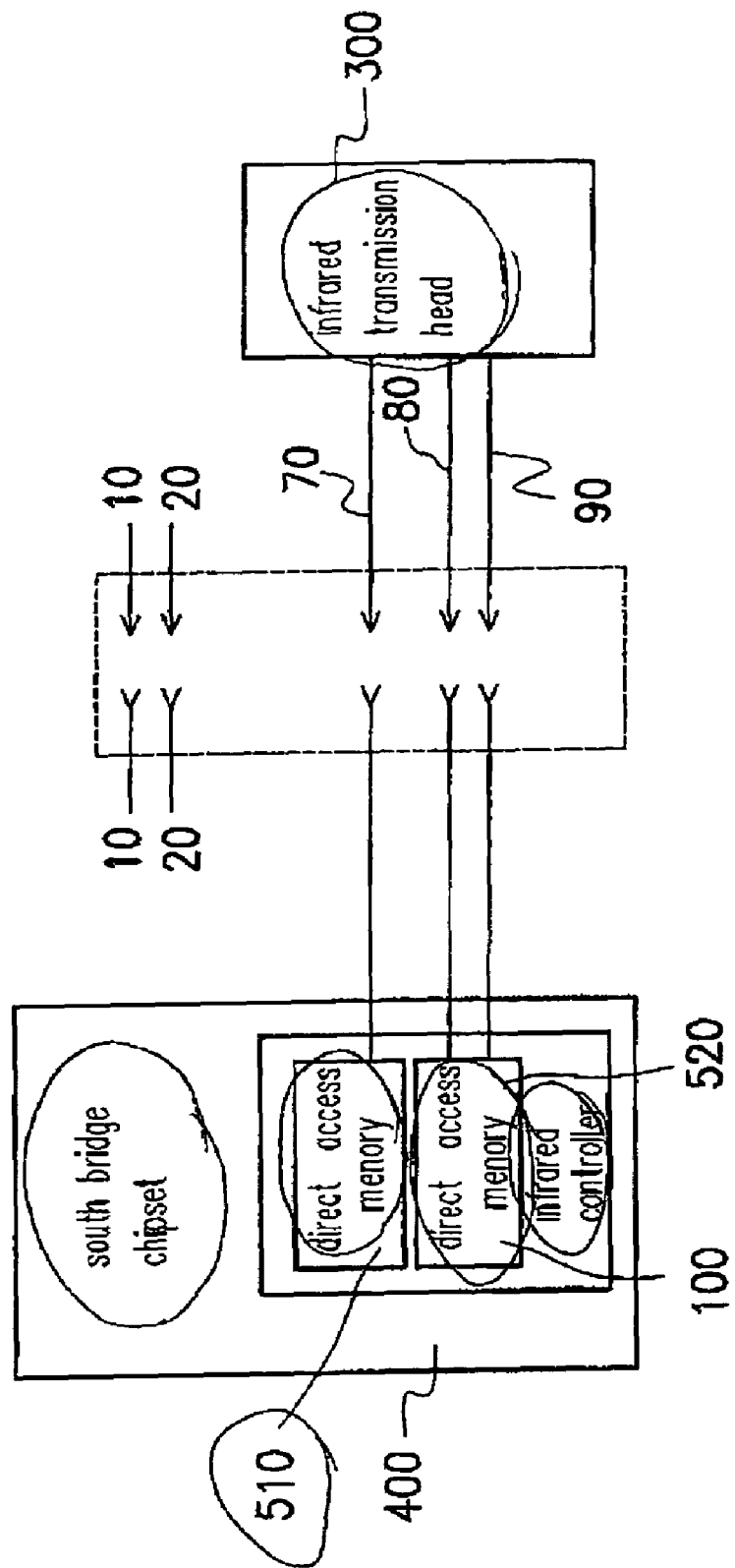
FIG. 3 is a block diagram showing the connection between an infrared controller and an infrared transmission head according to one preferred embodiment of this invention.

FIG. 3 is a block diagram showing the connection between an infrared controller and an infrared transmission head according to one preferred embodiment of this invention. As shown in FIG. 3, the infrared controller 100 is enclosed inside a South Bridge control chipset 400. The South Bridge control chipset 400 provides a few leads for use by the infrared controller 100. For example, the South Bridge control chipset 400 provides 5 leads to support the infrared controller 100 in this embodiment of the invention. The 5 leads include an output voltage (VCC) terminal 10, a ground voltage (GND) terminal 20, a transmission (TX) terminal 70, a first reception (RX1) terminal 80 and a second reception (RX2) terminal 90. Obviously, since the South Bridge control chipset 400 has a higher cost per lead, the smaller number of leads required by the infrared controller 100 the better. Hence, only five leads of the South Bridge control chipset are assigned. The infrared controller 100 has altogether two groups of direct access memory devices. One group of direct access memory devices 510 is used for data transmission while the other group of direct access memory device 520 is used for data reception. Because a conventional infrared controller operates as a half-duplex transmitter and receiver, data reception is temporarily suspended during data transmission and data transmission is temporarily suspended during data reception. Therefore data transmission and reception cannot operate concurrently. In this embodiment, however, the infrared controller 100 has two groups of direct access memory devices 510 and 520 for supporting test data transmission and test data reception simultaneously. Since the infrared controller 100 has full duplex capacity, a test circuit mode of the infrared controller 100 can be set accordingly so that the infrared transmission head 300 having an unknown brand name may be coupled to the infrared controller 100. Thereafter, the test data of a particular infrared transmission head 300 is selected from a group of infrared transmission heads consisting of various brand names. The brand names of commonly found infrared transmission heads include, for example, IBM, Vishay, HP, Sharp, Siemens and so on. The infrared controller 100 is programmed and then the test data is transmitted to the infrared transmission head 300. In the meantime, the infrared controller 100 also receives test data from the infrared transmission head 300. The transmitted test data and the received test data are compared inside the infrared controller 100. If the transmitted test data and the received test data are identical, the infrared transmission head 300 of the tested brand name is registered. If the transmitted test data and the received test data mismatch, test data from another infrared transmission head having a different brand name is selected. The process of sending test data and receiving test data is repeated and the transmitted test data and the received test data are again compared. If the data are identical, the infrared transmission head 300 of the tested brand name is registered as before. However, if there is a data mismatch, test data from another infrared transmission head having a different brand name is selected. The process is repeated until the test data of infrared transmission head of all brand names has been selected. Finally, the infrared transmission head 300 operates according to the registered data.

Figure 4:
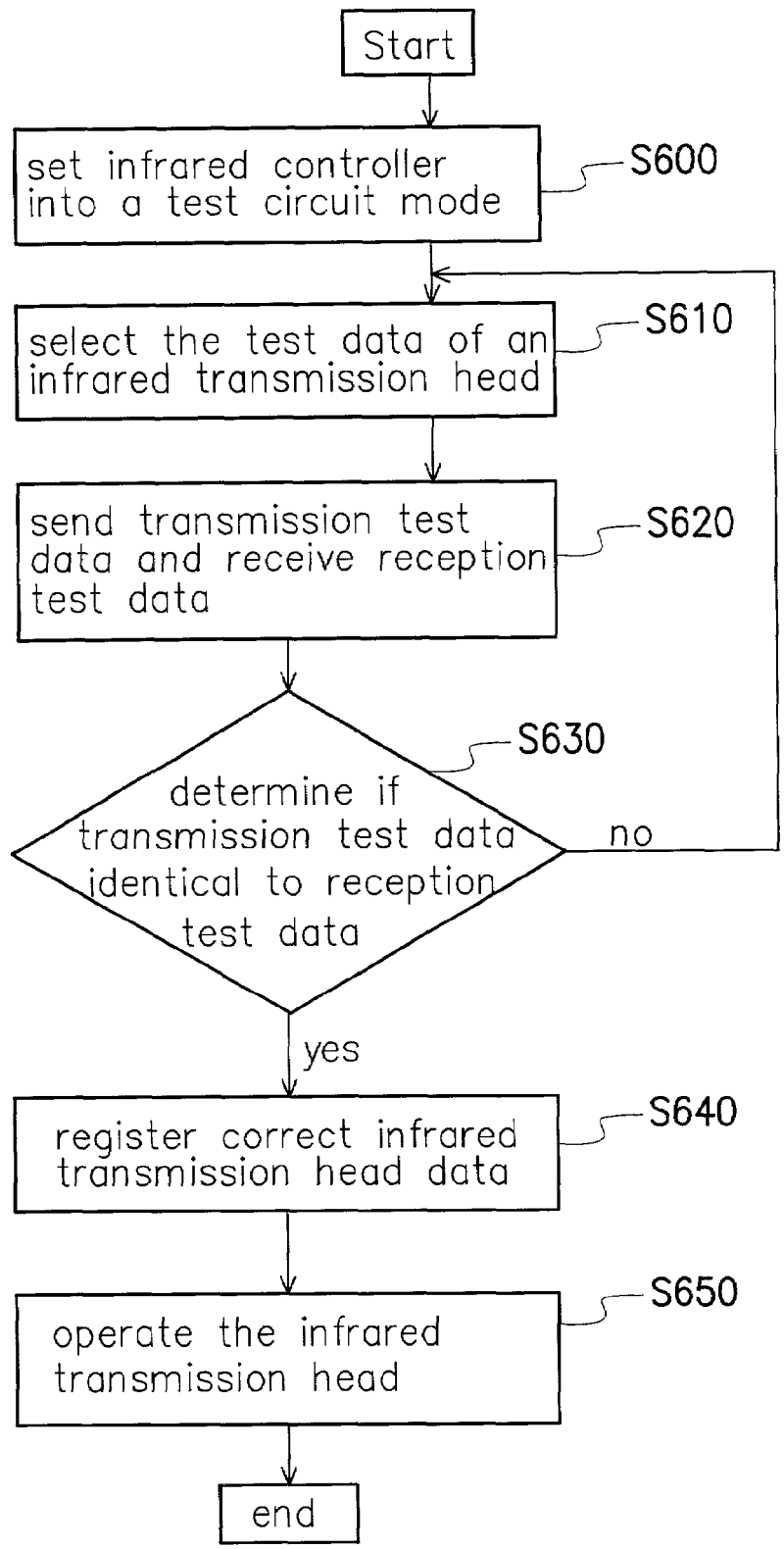
FIG. 4 is a flow chart showing the steps in the transmission method for identifying infrared transmission head functions according to one preferred embodiment of this invention.

FIG. 4 is a flow chart showing the steps in the data transmission method for identifying infrared transmission head functions according to one preferred embodiment of this invention. The infrared controller has two groups of direct access memory devices. First, the infrared controller is set to a test circuit mode (in step S600) as shown in FIG. 4. A to-be-tested infrared transmission head is coupled to the infrared controller and the test data of an infrared transmission head belonging to a particular brand name is selected from a panel of infrared transmission heads each having a different brand name (in step S610). The infrared controller transmits test data and receives test data at the same time (in step S620). In step S630, a comparison between the transmitted data and the received data is carried out. If the transmitted data and the received data are identical, the correct infrared transmission head data is registered (in step S630). The infrared transmission head operates according to the registered infrared transmission head data (in step S650). However, if the transmitted data and the received data have mismatch, steps S610 to S630 are repeated. If the test data of all the infrared transmission heads are tested and found no matched ones, failure of the infrared transmission head or error in the connection between the infrared transmission head and the infrared controller may be assumed.

In conclusion, one major advantage of this invention is the provision of a method for determining brand name and transmission mode of an infrared transmission head such that the cost of producing the infrared controller is greatly reduced. Moreover, only the leads of the South Bridge control chips serving as transmission and reception terminals are required. In addition, two groups of direct access memory devices are used to support both data transmission and reception simultaneously so that the brand name of a particular infrared transmission head may be determined automatically. Hence, the infrared controller designed according to this invention may couple with different infrared transmission heads of various brand names.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmission method for identifying infrared transmission head functions through an infrared controller coupled to an infrared transmission head, said method comprising the following steps:

setting said infrared controller in a test circuit mode;
selecting a test brand name and its corresponding test transmission mode of the infrared transmission head among a plurality of brand names;
executing an operation of programming said infrared controller according to the test transmission mode corresponding to the test brand name of said infrared transmission head;
said infrared controller's sending out transmission test data corresponding to the test brand name to the infrared transmission head;
said infrared controller's receiving test data according to the test transmission mode corresponding to the test brand name of said infrared transmission head;
registering said test brand name and associated test transmission mode of said infrared transmission head when said transmission test data and said received test data are identical; and
operating said infrared transmission head according to the registered test brand name and test transmission mode of said infrared transmission head;
wherein said infrared controller's sending out transmission test data and said infrared controller's receiving test data occur concurrently.

2. The transmission method of claim 1, wherein said method further includes repeating steps of selecting a test brand name, executing an operation of programming said infrared controller, said infrared controller's sending out transmission test data, said infrared controller's receiving test data, and registering said test brand name when said transmission test data and said received test data are identical until all said brand names have been selected as a test brand name.

3. The transmission method of claim 1, wherein said infrared transmission controller supports data transmission and reception simultaneously.

4. The transmission method of claim 1, wherein said infrared controller further includes a direct access memory unit partitioned into two separate groups, one group is used for holding transmission test data while said other group is used for holding received test data.

5. The transmission method of claim 1, wherein said infrared controller is enclosed within a South Bridge control chipset such that said South Bridge control chipset provides a few leads to serve as terminals of said infrared controller for data transmission and reception.

6. A transmission method for identifying infrared transmission head functions, comprising said steps of:

coupling an infrared controller to an infrared transmission head;
programming said infrared controller and executing said infrared controller's sending out transmission test data to the infrared transmission head;
said infrared controller's receiving reception test data from the infrared transmission head; and
registering said a brand name and its corresponding test transmission mode of said infrared transmission head when said transmission test data and said reception test data is identical;
wherein said infrared controller's sending out transmission test data and said infrared controller's receiving test data occur concurrently.

7. The transmission method of claim 6, wherein said infrared controller supports data transmission and reception simultaneously.

8. The transmission method of claim 6, said infrared controller works under a test circuit mode.

9. The transmission method of claim 6, wherein said step of said infrared controller's sending out transmission test data is based on said test transmission mode corresponding to the test brand name of said infrared transmission head.

10. The transmission method of claim 6, wherein said step of said infrared controller's receiving reception test data is based on said test transmission mode corresponding to the test brand name of said infrared transmission head.

11. The transmission method of claim 6, wherein said method further includes selecting test brand name and its corresponding transmission mode among a plurality of brand names.

12. The transmission method of claim 11, wherein said method further includes repeating said steps of selecting a test brand name, said infrared controller's sending out transmission test data, said infrared controller's receiving test data, and registering said test brand name when said transmission test data and said received test data are identical until all said brand names have been selected to serve as a test brand name.

13. The transmission method of claim 6, wherein said infrared controller further includes a direct access memory unit partitioned into two separate groups, one group is used for holding transmission test data while said other group is used for holding received test data.

14. The transmission method of claim 6, wherein said infrared controller is enclosed within a South Bridge control chipset such that said South Bridge control chipset provides a few leads to serve as terminals of said infrared controller for data transmission and reception.

* * * * *